United States Patent
Mishima et al.

(10) Patent No.: US 7,982,919 B2
(45) Date of Patent: Jul. 19, 2011

(54) IMAGE FORMING APPARATUS AND INFORMATION PROCESSING METHOD AND INFORMATION PROCESSING PROGRAM USED THEREIN

(75) Inventors: Kimie Mishima, Itami (JP); Yoshiyuki Tamai, Itami (JP); Masami Yamada, Osaka (JP); Yoshiki Tokimoto, Nishiwaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1797 days.

(21) Appl. No.: 11/009,048

(22) Filed: Dec. 13, 2004

(65) Prior Publication Data
US 2006/0031344 A1 Feb. 9, 2006

(30) Foreign Application Priority Data

May 17, 2004 (JP) .................................. 2004-145891

(51) Int. Cl.
*H04N 1/00* (2006.01)
(52) U.S. Cl. ........ 358/402; 358/400; 358/440; 709/203; 709/206
(58) Field of Classification Search .......... 709/201–203, 709/206, 217–219, 229; 358/1.9, 3.23–3.24, 358/505, 400–403, 440; 707/10; 717/705, 717/727–729, 752; 719/313, 318; 715/705, 715/727–729, 752
See application file for complete search history.

(56) References Cited

U.S. PATENT DOCUMENTS

| 5,339,156 | A | * | 8/1994 | Ishii ............................... 358/402 |
| 6,246,983 | B1 | * | 6/2001 | Zou et al. ....................... 704/260 |
| 6,549,504 | B2 | * | 4/2003 | Liu et al. ................... 369/112.24 |
| 6,658,456 | B1 | * | 12/2003 | Shimoosawa ................. 709/206 |
| 6,714,326 | B1 | * | 3/2004 | Yamada ......................... 358/498 |
| 7,027,192 | B2 | * | 4/2006 | Kawai ............................ 358/402 |
| 7,080,040 | B2 | * | 7/2006 | Akiyama ........................ 705/51 |
| 7,119,918 | B2 | * | 10/2006 | Toyoda et al. ................ 358/1.15 |
| 7,161,697 | B2 | * | 1/2007 | Yajima ......................... 358/1.15 |

(Continued)

FOREIGN PATENT DOCUMENTS

JP 2002-215549 * 8/2002
JP 2002-300362 10/2002

*Primary Examiner* — Rupal D Dharia
*Assistant Examiner* — Sarah E Drabik
(74) *Attorney, Agent, or Firm* — Morrison & Foerster LLP

(57) ABSTRACT

An image forming apparatus, method, and computer program product can create and transmit an e-mail to which is attached an image file created by an image forming apparatus and a file received from an external device. The image forming apparatus can include an image reader and an operation unit including one-touch keys. If a received email instructs one-touch key registration, mailing information including recipient information and one or more attached files can be obtained from the email and associated with a one-touch key. If reading of an original document by the image reader is specified by operation of a one-touch key, the mailing information and file information associated with the one-touch key can be read, an email can be created including the created image file and the one or more attached files, and the email can be sent to a recipient corresponding to the recipient information.

14 Claims, 5 Drawing Sheets

U.S. PATENT DOCUMENTS

| | | | |
|---|---|---|---|
| 2002/0067514 A1* | 6/2002 | Izumi et al. | 358/402 |
| 2002/0118396 A1* | 8/2002 | Kawai | 358/402 |
| 2002/0191223 A1* | 12/2002 | Ishikawa | 358/402 |
| 2002/0196478 A1* | 12/2002 | Struble | 358/474 |
| 2003/0110395 A1* | 6/2003 | Presotto et al. | 713/201 |
| 2003/0236868 A1* | 12/2003 | Naitou | 709/220 |
| 2004/0052433 A1* | 3/2004 | Henry et al. | 382/305 |
| 2005/0192945 A1* | 9/2005 | Motosugi et al. | 707/3 |
| 2005/0219227 A1* | 10/2005 | Yamahata et al. | 345/173 |
| 2006/0004867 A1* | 1/2006 | Tamai et al. | 707/104.1 |

* cited by examiner ly used.
IMAGE FORMING APPARATUS AND INFORMATION PROCESSING METHOD AND INFORMATION PROCESSING PROGRAM USED THEREIN This application is based on Japanese Patent Application No. 2004-145891 filed in Japan on May 17, 2004, the entire content of which is hereby incorporated by reference.

BACKGROUND OF THE INVENTION

1. Filed of the Invention

The present invention relates to an image forming apparatus that can send and receive data to and from one or more prescribed information processing terminals, as well as to an information processing method and information processing program used therein.

2. Description of the Related Art

In recent years, as image forming apparatuses such as scanners, copiers, MFPs or the like used in an office, network-compatible apparatuses that are connected to a network and can send and receive data to and from information processing terminals also connected to the network have become widely used.

For a network that includes such an image forming apparatus, there are two principal methods by which an image file formed by such image forming apparatus is attached to an e-mail and sent to a desired recipient.

In the first method, the image file is first sent from the image forming apparatus to an information processing terminal, where the e-mail recipient's address is input and the e-mail's title and text are entered, whereupon the image file is attached to the e-mail and the e-mail is sent.

In the second method, information regarding the e-mail recipient, title and main text is sent via e-mail to the image forming apparatus, where the recipient is specified based on the information included in the received e-mail without the need for entry of such information, whereupon the image file formed by the image forming apparatus is attached to an e-mail and the e-mail is sent, as disclosed in Japanese Patent Laid-Open Nos. 2002-215549 and 2002-300362, for example.

In the first method, because the e-mail to which the image file is attached is sent after the image file is sent to the information processing terminal, the image file is unnecessarily stored twice in the information processing terminal, i.e., when the image file is received from the image forming apparatus and when the e-mail is sent from the information processing terminal, which decreases the amount of available memory in the information processing terminal.

The second method entails the disadvantage that files other than the image file obtained from original document reading by the image forming apparatus cannot be attached to the e-mail. Furthermore, in the second method, the parameters governing the original document reading carried out by the image forming apparatus must be set using the operation unit located on the apparatus. Enabling the parameters governing original document reading to be set on the side of the information processing terminal together with other parameters such as the e-mail recipient would improve the convenience of the method.

OBJECT AND SUMMARY

An object of the present invention is to provide an improved image forming apparatus and associated information processing method and information processing program that eliminate the problems described above.

Another object of the present invention is to provide an image forming apparatus, as well as an associated information processing method and information processing program, that can create and transmit an e-mail to which is attached an image file created by the image forming apparatus, as well as a file received from an external device such as an information processing terminal, without reducing the capacity of the memory installed on the external device.

The above objects are achieved by providing an image forming apparatus comprising the following, for example:

an image reader that creates an image file by reading an original document;

an operation unit that includes one-touch keys that receive selection operations carried out by the user;

a receiving unit that receives an e-mail;

a determination unit that determines whether or not the e-mail received by the receiving unit is an e-mail instructing one-touch key registration;

an obtaining unit that, where it is determined by the determination unit that the received e-mail is an e-mail instructing one-touch key registration, obtains from that e-mail mailing information including at least recipient information and the file(s) attached to the e-mail;

a storage unit that stores the mailing information and file(s) obtained by the obtaining unit;

an association unit that associates the mailing information and the attached file information with a one-touch key; and a controller that, where reading of an original document by the image reader is specified by a selection operation carried out using a one-touch key, reads the mailing information and the attached file information associated with the one-touch key, creates an e-mail to which are attached one or more files corresponding to the attached file information and the image file created during original document reading, and sends the e-mail to the recipient corresponding to the recipient information included in the mailing information.

BRIEF DESCRIPTION OF THE DRAWINGS

These and other objects and features of the present invention will become clear from the following description taken in conjunction with the preferred embodiments thereof with reference to the accompanying drawings, in which:

FIG. 5 shows a recipient selection screen displayed on the operation panel of

DETAILED DESCRIPTION OF THE PREFERRED EMBODIMENTS

An embodiment of the present invention will be described below with reference to the attached drawings. In this embodiment, the 'image forming apparatus' of the present invention comprises a multifunction peripheral (hereinafter 'MFP') that includes multiple functions such as a printer function, a facsimile function, a copier function and a scanner function, and an 'external device' comprises an information processing terminal such as a personal computer.

Figure 1:
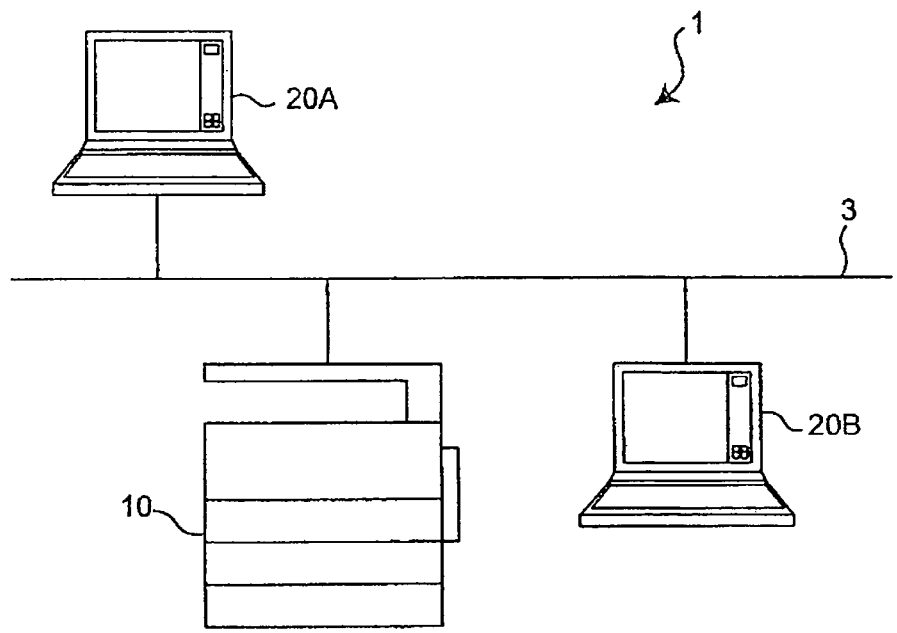
FIG. 1 shows the construction of a network that includes an MFP pertaining to an embodiment of the present invention and multiple information processing terminals.

FIG. 1 shows in a schematic fashion the construction of a network that includes the MFP pertaining to an embodiment of the present invention and multiple information processing terminals. This network 1 has an MFP 10 and information processing terminals 20A and 20B. These apparatuses are interconnected via a network bus 3 such that data can be sent and received to and from one another. In this network 1, an image file can be obtained via the reading of an original document by the image reader 12 (see FIG. 2) of the MFP 10, for example, and sent to the information processing terminal 20A or 20B for display or storage thereon, and information data (including image files) can be processed by the information processing terminal 20A or 20B and sent to the MFP 10, which prints the information data or performs other operations in connection therewith.

The network 1 may be connected to the Internet over the network bus 3, though this is not shown in the drawing. In this case, the MFP 10 can send the image the Internet, receive information data from the remote terminal over the Internet, and print it or perform other operations in connection therewith, for example. Furthermore, while as a practical matter the construction of the network 1 includes components not shown in FIG. 1, such as a proxy server, mail server, router and the like, such components are omitted here.

In this network 1, an e-mail may be sent to the MFP 10 from the information processing terminal 20A, for example, and preparation for transmission of an e-mail to a desired recipient (the information processing terminal 20B), to which is attached an image file created by the MFP 10, may be instructed using this e-mail. In addition, in this embodiment, when a transmission instruction is issued using an e-mail from the information processing terminal 20A to the MFP 10, by attaching a data file to the e-mail, when an e-mail is sent from the MFP 10 to the desired recipient, it may be sent together with the image file obtained via original document reading as a file attached to the e-mail.

The construction and processing employed in order to realize the capabilities described above will now be described. The discussion below uses as an example the issuance from the information processing terminal 20A to the MFP 10 of an instruction to prepare for transmission of an e-mail to the information processing terminal 20B, but the present invention is not limited to this implementation, and the terminal that sends the instruction to the MFP 10 or the terminal designated as the e-mail recipient may comprise a terminal that resides on a different network connected to the Internet, for example, so long as such terminal can send and receive data to and from the MFP 10.

Figure 2:
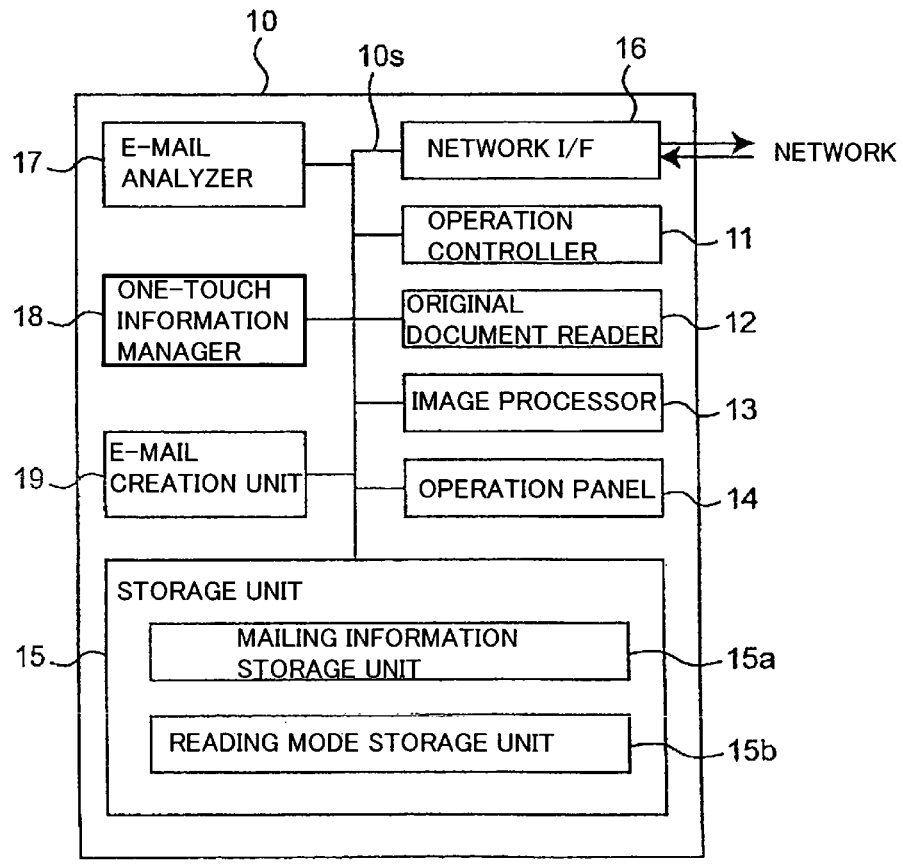
FIG. 2 shows the basic construction of the MFP.

The MFP 10 has as components pertaining to the present invention an operation controller 11, an image reader 12, an image processor 13, an operation panel 14, a storage unit 15, a network interface unit (network I/F in the drawing) 16, an e-mail analyzer 17, a one-touch information manager 18 and an e-mail creation unit 19, as shown in FIG. 2. These components are mutually interconnected over a bus 10s to enable data to be transmitted and received therebetween.

The operation controller 11 controls the operations of the various components of the MFP 10. The image reader 12 scans an original document. The image processor 13 performs image processing of the image file obtained by the image reader 12 or the like, such as color correction, compression and decompression. The operation panel 14 is a touch-panel display device that functions as a user interface.

The storage unit 15 stores programs that support control by the operation controller 11. It also functions as a work area needed for execution of such programs and temporarily stores print job data sent from an external device, as well as stores various items of setting information entered by the user in connection with a function by which frequently-used image file recipient information, for example, is registered in advance and read out to be set at the time of use (the so-called one-touch registration function).

The one-touch registration function permits pre-stored information to be read out based simply on the selection of a key displayed on the operation panel 14 when a fax document or e-mail is to be sent. As a result, the setting operation can be simplified, since the fax number, e-mail address or other information regarding the recipient need not be entered each time a fax document or e-mail is to be sent.

Ordinarily, in order to enable the registration of multiple items of setting information (hereinafter 'one-touch information'), the storage unit 15 of the MFP 10 is configured to have multiple storage areas (hereinafter 'one-touch areas') that store the various items of one-touch information, and keys corresponding to each one-touch area (hereinafter 'one-touch keys') are displayed on the operation panel 14. The one-touch information stored in each one-touch area can be selected by operating the corresponding key.

The network interface unit 16 executes the sending and receiving of various data files including image files to and from external devices. The e-mail analyzer 17 analyzes the e-mail sent from the information processing terminal 20A and obtains mailing information including the recipient, the title, the sender, the main text, attached files and the like. The one-touch information manager 18 manages the one-touch information described above such that it is associated with a one-touch key displayed on the operation panel 14 and a one-touch area set in the storage unit 15. The e-mail creation unit 19 creates the e-mail to be sent to the information processing terminal 20B based on the mailing information obtained by the e-mail analyzer 17.

In addition, as shown in FIG. 2, the storage unit 15 includes a mailing sender and main text, which is obtained via analysis by the e-mail analyzer 17 of the e-mail sent by the information processing terminal 20A, as well as any data files attached to the e-mail, and a reading mode storage unit 15b that stores the set parameters (hereinafter 'original document reading parameters') pertaining to the reading of an original document that are included in the e-mail analyzed by the e-mail analyzer 17.

Figure 3:
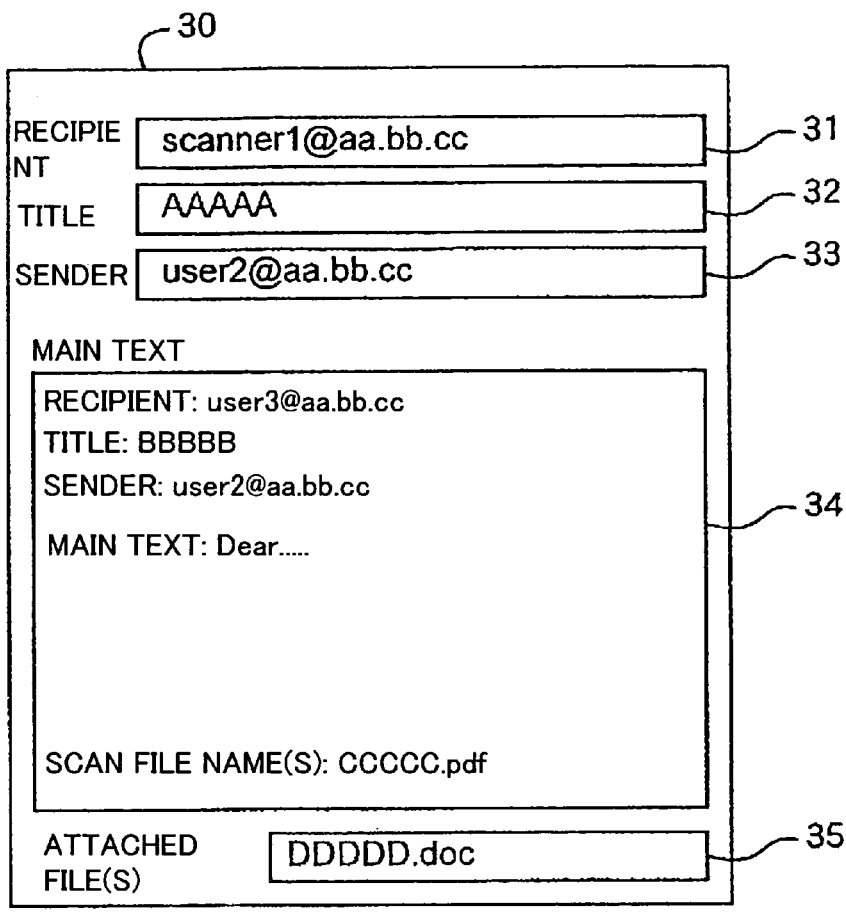
FIG. 3 shows the basic structure of an e-mail sent to the MFP by an information processing terminal.
Figure 4:
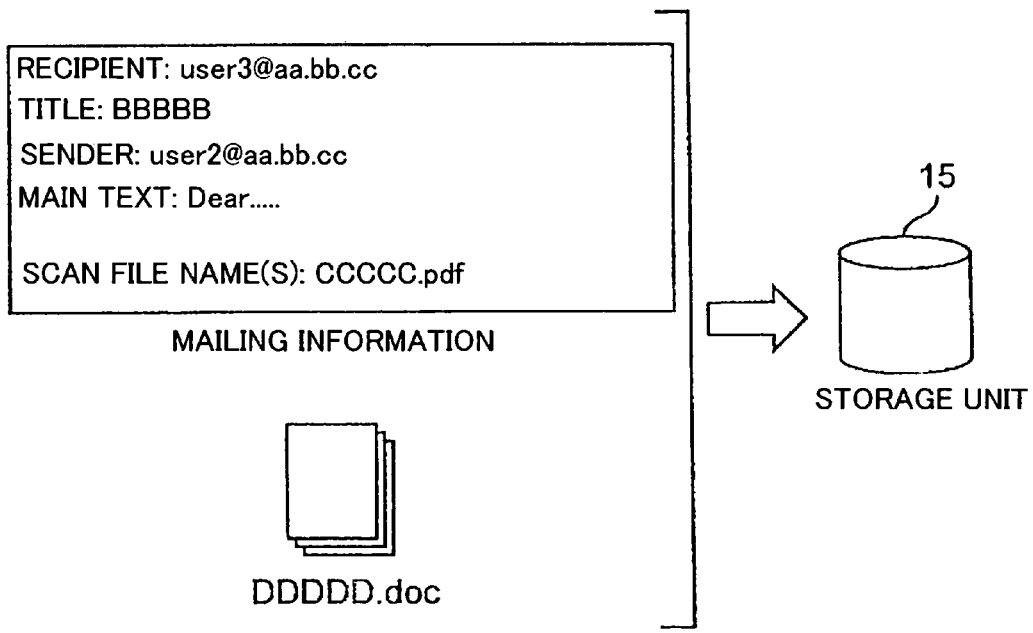
FIG. 4 is an explanatory drawing showing the saving of mailing information and an image file in the MFP when the e-mail shown in FIG. 3 is received.

FIG. 3 shows the basic structure of the e-mail 30 sent to the MFP 10 from the information processing terminal 20A. The e-mail 30 is sent from the information processing terminal 20A to the MFP 10 in order to instruct preparation for the transmission of an e-mail to which an image file to be obtained by the MFP 10 and one or more other data files are attached. The e-mail 30 is composed of a recipient window 31, a title window 32, a sender window 33, a main text window 34 and an attached file window 35. In the example shown in FIG. 3, the MFP 10's e-mail address 'scanner1@aa.bb.cc' is entered in the recipient window 31, the title 'AAAAA' of the e-mail 30 itself is entered in the title window 32, and the e-mail address 'user2@aa.bb.cc' of the information processing terminal 20A is entered in the sender window 33.

Contained in the main text window 34 are the main text 'Dear . . . ', the e-mail address 'user3 @aa.bb.cc' of the information processing terminal 20B comprising the recipient of the e-mail 40 (see FIG. 5) to be sent via the MFP 10, the title 'BBBBB' of the e-mail 40, the e-mail address 'user2 @aa.bb.cc' of the information processing terminal 20A comprising the sender, and the scan file name 'CCCCC.pdf' to be used for the image file to be obtained in connection with the e-mail 30 by the image reader 12 of the MFP 10.

In addition, the file name 'DDDDD.doc' of the attached file (document file) sent from the information processing terminal 20A to the MFP10 as an attachment to the e-mail 30 is entered in the attached file window 35.

Figure 5:
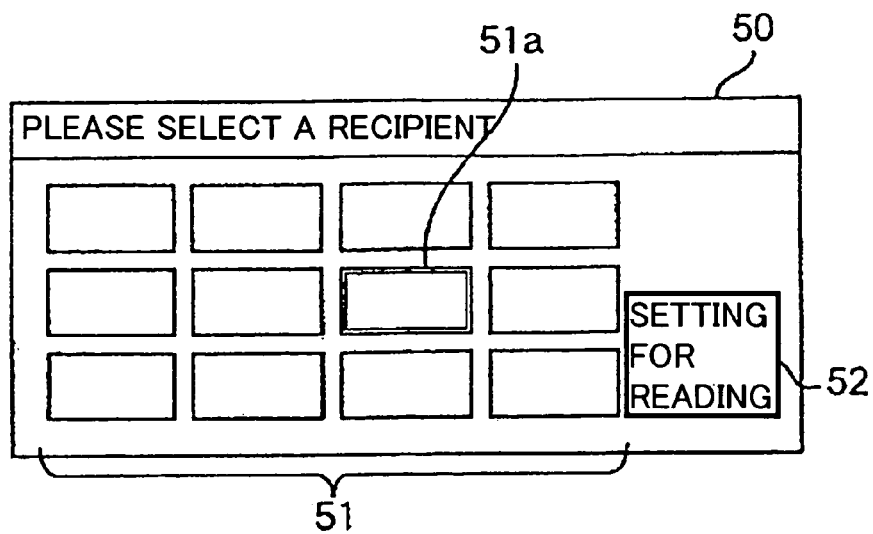

In the MFP 10, when the e-mail 30 having the above structure is received, the mailing information that includes the 'recipient', 'title', 'sender' and 'scan file name' contained in the main text window 34 of the e-mail 30 and the attached file 'DDDD.doc' are read and stored in the storage unit 15 through analysis of the e-mail 30, as shown in as new one-touch information and a one-touch key 51 that is displayed on the operation panel 14 and is associated with this one-touch information is newly created (see FIG. 5).

In the MFP 10, when the received e-mail is analyzed, it is determined, based on whether or not 'recipient' information is contained in the main text window 34, for example, whether or not the e-mail is a one-touch registration e-mail requesting the creation of a one-touch key 51. If and only if the received e-mail is determined to be a one-touch registration e-mail, a one-touch key 51 is newly created.

In this embodiment, an example is described in which a one-touch key 51 on the operation panel 14 is newly created, but the present invention is not limited to this implementation, and the mailing information and the attached file information may alternatively be associated with an existing one-touch key as one-touch information, for example. Furthermore, in this embodiment, an operation panel 14 comprising a touch-panel display device is used, but the present invention is not limited to this implementation, and operation means comprising hardware keys may alternatively be used for the one-touch keys. Where this type of operation means is adopted, the mailing information and attached file information are always associated with an existing hardware key.

FIG. 5 shows a recipient selection screen 50 displayed on the operation panel 14 of the MFP 10. This recipient selection screen 50 is a screen by which the user can select the recipient (addressee) of an image file obtained by the MFP 10 (such as an image file obtained by the image reader 12) or a file already saved on the MFP 10. Twelve one-touch keys 51 (having a 3×4 vertical/horizontal aspect ratio) corresponding to the individual items of one-touch information stored in the storage unit 15 are disposed on the recipient selection screen 50 shown in FIG. 5.

Among the one-touch keys 51, the one-touch key indicated by the symbol 51a is the one-touch key corresponding to the one-touch information comprising the mailing information and attached file information included in the e-mail 30 shown in FIG. 3. When the read/set key 52 located at the bottom right of the recipient selection screen 50 is touched after one of these one-touch keys 51 is selected, the one-touch information corresponding to the selected one-touch key 51 is read and set by the one-touch information manager 18.

When the read/set key 52 located at the bottom right of the recipient selection screen 50 is touched after the one-touch key 51a is selected in the recipient selection screen 50 shown in FIG. 5, the one-touch information comprising the mailing information and attached file information included in the e-mail 30 shown in FIG. 3 is set. When the user instructs the execution of original document reading when this setting is present, an image file is created by the image reader 12.

Figure 6:
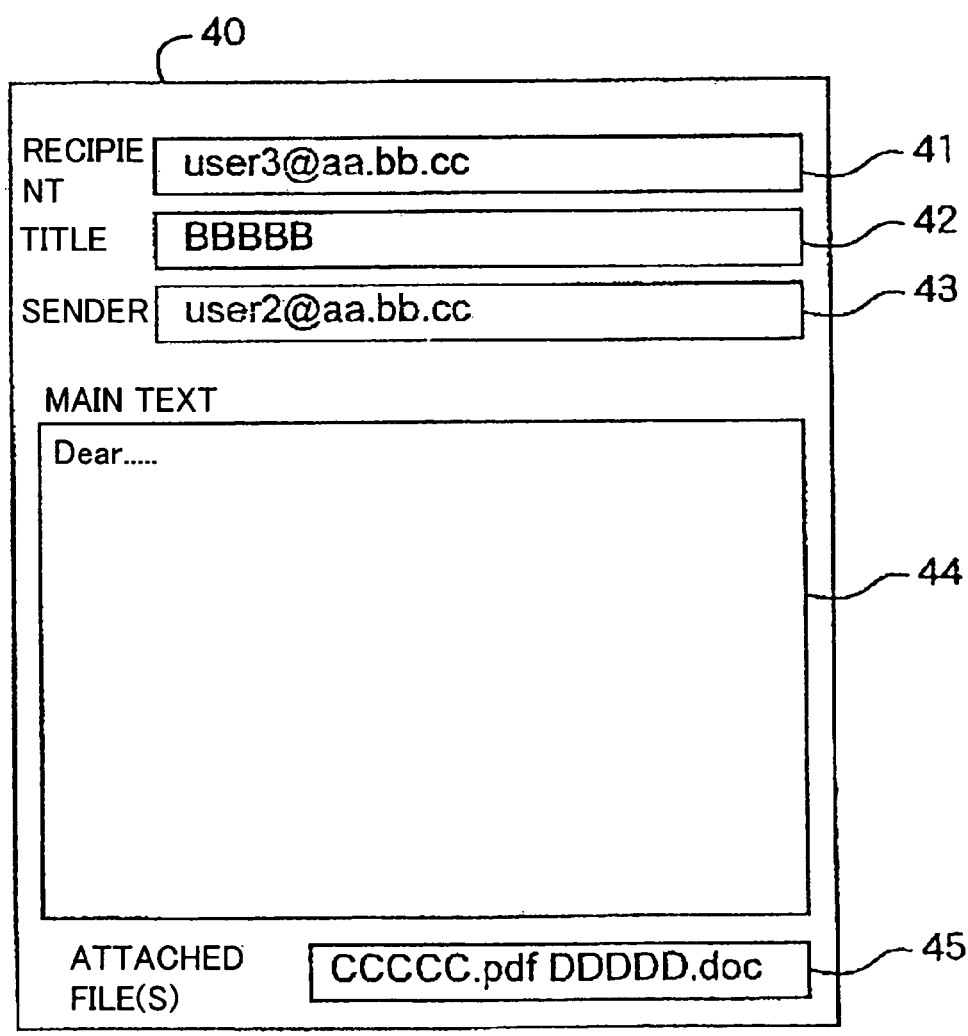
FIG. 6 shows an e-mail created by the MFP based on the mailing information included in the e-mail shown in FIG. 3 and a file attached thereto.

The e-mail 40 shown in FIG. 6 is then created by the e-mail creation unit 19 of the MFP 10 and sent to the set recipient. This e-mail 40 comprises a recipient window 41, a title window 42, a sender window 43, a main text window 44 and an attached file window 45. The mailing information and attached file information contained in the e-mail 30 in FIG. 3 are reflected in these windows.

Specifically, the e-mail address 'user3 @aa.bb.cc' of the information processing terminal 20B is entered in the recipient window 41, the title 'BBBB' of the e-mail 40 is entered in the title window 42, and the e-mail address 'user2@aa.bb.cc' of the information processing terminal 20A is entered in the sender window 43. The main text 'Dear . . . ' is contained in the main text window 44, and the scan file name 'CCCCC.pdf' of the image file obtained by the image reader 12, as well as the file name 'DDDDD.doc' of the document file sent from the information processing terminal 20A and stored in the storage unit 15, are entered in the attached file window 45.

The image file 'CCCCC.pdf' and the document file 'DDDDD.doc' are attached to the e-mail 40 having the above structure and are transmitted together therewith from the MFP 10 to the information processing terminal 20B. As a result, the transmission between the information processing terminals 20A and 20B of an e-mail to which are attached not only image files obtained by the MFP 10 but other files as well can be easily achieved.

In this embodiment, by including original document reading parameters (reading mode information) in the e-mail 30 sent from the information processing terminal 20A to the MFP 10, original document reading that reflects such set parameters can be carried out by the MFP 10. Specifically, by including reading mode information such as 'Document binding margin: Top or bottom' in the main text window of the e-mail 30 shown in FIG. 3, the reading mode information can be read during e-mail the obtained reading mode information is associated with the newly created one-touch key in the same manner as the mailing information obtained through analysis of the e-mail.

When a one-touch key associated with the reading mode information is selected, one-touch information comprising mailing information and attached file information is set, and original document reading parameters are also set based on the reading mode information. When the user instructs the execution of original document reading based on these settings, an image file reflecting the original document reading parameters is created by the image reader 12.

In this embodiment, by attaching various types of program files to the e-mail 30 sent from the information processing terminal 20A to the MFP 10, processing can be carried out on the MFP 10 based on the attached program files. Specifically, the help screen program file 'DDDDD.cpp' is attached to the e-mail 30 shown in FIG. 3 and text indicating that the program file was attached (such as 'The attached file ' DDDDD.cpp' is a help screen program file.') is contained in the main text window 34 of the e-mail 30.

By having the MFP 10 analyze the received e-mail 30, the attached program file is stored in the reading mode storage unit 15b as help screen information. In this case, the help screen information is associated with the newly created one-touch key in the same manner as the mailing information obtained through analysis of the e-mail.

Figure 7A:
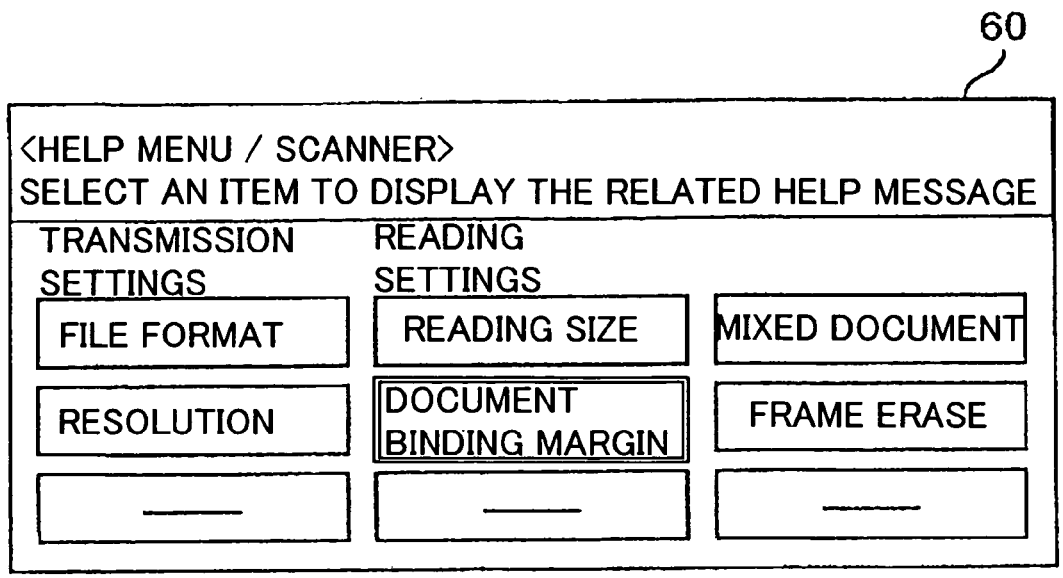
FIG. 7A shows a first help screen displayed on the operation panel of the MFP based on a program file attached to an e-mail sent from an information processing terminal.
Figure 7B:
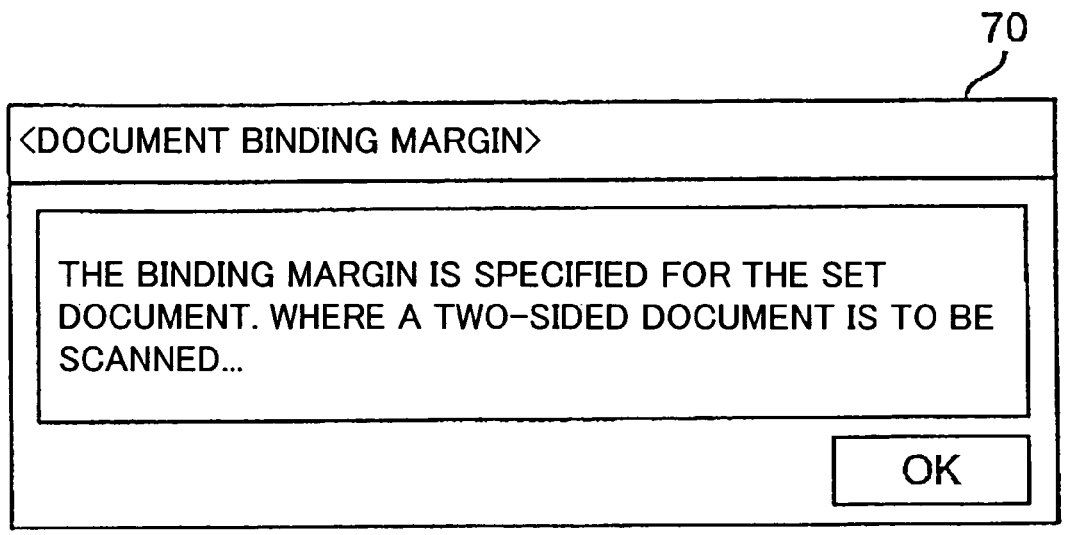
FIG. 7B shows a second help screen displayed on the operation panel of the MFP based on a program file attached to an e-mail sent from an information processing terminal.

When the one-touch key associated with the help screen information is selected, the associated one-touch information is set and the program file stored in the reading mode storage unit 15b is read and executed. If the user subsequently instructs display of the help screen on the operation panel 14, first, the help screen 60 used by the user to select from among multiple items is displayed as shown in FIG. 7A, and if the user selects the item 'Document binding margin' among the multiple items, the help screen 70 describing 'Document binding margin' is displayed as shown in FIG. 7B.

The program file attached to the e-mail 30 sent from the information processing terminal 20A to the MFP 10 is not limited to a help screen file, and may comprise a file used to provide audio guidance. In this case, as in the case where a help screen program file was attached, the e-mail 30 to be sent to the MFP 10 is created by the information processing terminal 20A, and processing based on the attached program guidance program file enables the user to perform the original document reading operation in accordance with the audio guidance.

Figure 8:
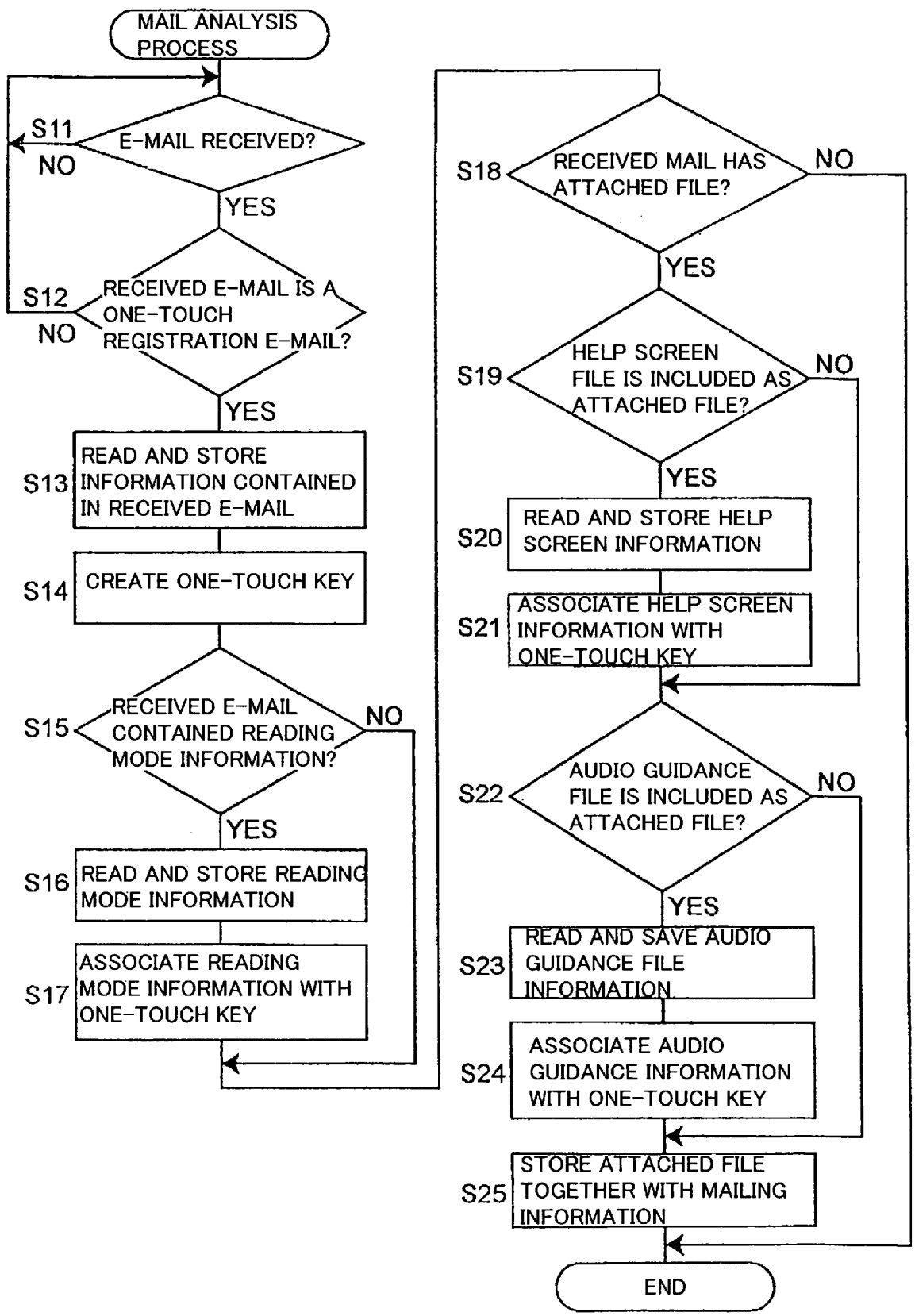
FIG. 8 is a flow chart regarding a mail analysis process executed by the MFP.

FIG. 8 is a flow chart showing the sequence of operations of the mail analysis process carried out on the MFP 10. In this process, it is first determined whether or not an e-mail has been received (S11). If it is determined that an e-mail has not been received, S11 is repeated, while if it is determined that an e-mail has been received, it is then determined whether or not the received e-mail is a one-touch registration e-mail (S12). This is done by determining, for example, whether or not 'Recipient' information is contained in the main text window of the received e-mail (the main text window 34 of the e-mail 30, for example).

If it is determined in S12 that the e-mail is not a one-touch registration e-mail, the MFP 10 returns to S11, and the steps beginning with S11 are repeated, while if it is determined that the e-mail is a one-touch registration e-mail, the mailing information contained in the e-mail (recipient, title, main text, etc.) are read and stored as one-touch information (S13).

A one-touch key such as those displayed in the recipient selection screen 50 (see FIG. 5) on the operation panel 14, for example, is then created in association with the one-touch information (S14). It is then determined whether or not the received e-mail contains reading mode information (S15). If it is determined that the received e-mail does not contain reading mode information, the MFP 10 advances to S18, while if it is determined that the received e-mail does contain reading mode information, the reading mode information is read and saved (S16).

The reading mode information read in S16 is then associated with the one-touch key created in S14 (S17). It is then determined whether or not the received e-mail has an attached file (such as the document file 'DDDDD.doc' attached to the e-mail 30, for example) (S18). If it is determined that the e-mail does not have an attached file, it is deemed that a file other than the image file to be obtained by the MFP 10 is not going to be attached to the e-mail to be sent from the MFP 10, and processing is immediately terminated. If it is determined that the e-mail has an attached file, on the other hand, it is determined whether or not a help screen file is included as an attached file (S19).

If it is determined in S19 that a help screen file is not included, the MFP 10 advances to S22, while if it is determined that a help screen file is included, the help screen file is read and saved (S20). The help screen information read in step S20 is then associated with the one-touch key created in S14 (S21).

It is next determined whether or not an audio guidance file is included as an attached file (S22). If it is determined that an audio guidance file is not included, the MFP 10 advances to S25, while if it is determined that an audio guidance file is included, the audio guidance file is read and saved (S23). The read audio guidance information is then associated with the one-touch key created in S14 (S24). The attached file is then saved together with the mailing information (S25), whereupon processing is ended.

As described above, according to the MFP 10 of this embodiment, e-mails to which are attached not only one or more by the MFP prescribed files attached by the information processing terminal 20A or 20B, but also one or more image files created 10, can be easily sent and received to and from the information processing terminals 20A and 20B. In addition, because a one-touch key 51 is automatically created and associated with information contained in the e-mail received by the information processing terminal 20A or 20B and attached prescribed files, an operation panel 14 offering superior convenience and usability may be realized.

Where original document reading parameters are attached to the received e-mail, the operation of the operation panel 14 can be further simplified by setting these parameters when the one-touch key 51 is selected. Where a program file is attached to the received e-mail, a more multifunctional operation panel 14 may be realized by executing processing based on this program file when the one-touch key 51 is selected. Depending on the type of program file attached, operations other than those that increase the functionality of the operation panel 14 may be realized.

Furthermore, in this case, because the image file created by the MFP 10 need not be stored temporarily on the information processing terminal 20A or 20B, there is no risk of reducing the available capacity of the memory installed therein.

The present invention is not limited to the embodiment described herein, and needless to say, may be improved or modified in various ways within the essential While an MFP was used as an example of the image forming apparatus in the above embodiment, the image forming apparatus is not limited thereto, and the present invention may also be applied where a network scanner or other apparatus is used, so long as such apparatus can send and receive data to and from information processing terminals and has an original document reading function.

Furthermore, in the above embodiment, while an example was described in which information contained in the received e-mail was registered by the MFP 10 as one-touch information in connection with the one-touch registration function thereof, the present invention is not limited to this implementation, and such information may be registered in connection with a different function. For example, where an e-mail containing information indicating the printing parameters is received, it is acceptable if the MFP 10 analyzes the information contained in the e-mail and the obtained information is saved as new printing parameters based on a job memory function whereby frequently-used printing parameters may be registered in advance. The MFP 10 may also carry out default setting for the printing function based on the information obtained from the e-mail.

In the above embodiment, an example was described in which an e-mail to which a document file or program file was attached was received and processed by the MFP 10, but the present invention is not limited to this implementation, and the MFP 10 can also handle e-mails to which other types of files are attached. For example, where an e-mail to which an overlay image file is attached with text indicating in the main text window that an overlay image file is attached (such as 'The attached file 'DDDDD.pdf' is an overlay image.') is received, the MFP 10 can analyze the information contained in the e-mail together with the attached file and send an e-mail to which the overlay image is attached to the prescribed recipient.

According to the above embodiment, the sending and receiving between information processing terminals of e-mails to which are attached not only one or more prescribed files attached by an information processing terminal but also one or more image files created by an image forming apparatus can be easily realized. Furthermore, in the image forming apparatus, because a selection key by which the user can select mailing information to be set is automatically created for the mailing information contained in an e-mail and prescribed attached files received from an information processing terminal, a high degree of usability and convenience can be achieved.

What is claimed is:

1. An image forming apparatus comprising:
   an image reader for creating an image file by reading an original document;
   an operation unit that includes one-touch keys that receive selection operations carried out by a user;
   a receiving unit for receiving a first e-mail;
   a determination unit for determining whether or not the first e-mail received by the receiving unit is an e-mail instructing one-touch key registration;
   an obtaining unit for, where it is determined by the determination unit that the received first e-mail is an e-mail instructing one-touch key registration, obtaining from the first e-mail mailing information including at least recipient information and one or more files attached to the first e-mail;
   a storage unit for storing the mailing information and the one or more files obtained by the obtaining unit;
   an association unit for creating a new one-touch key on the display device and associating the mailing information and the attached file information with the created one-touch key when it is determined by the determination unit that the received first e-mail is an e-mail instructing one-touch key registration, wherein the attached file information comprises information pertaining to the one or more attached files; and
   a controller for, where reading of an original document by the image reader is specified by a selection operation carried out using the created one-touch key, reading the mailing information and the attached file information associated with the created one-touch key, creating a second e-mail to which are attached the one or more files corresponding to the attached file information and the image file created during original document reading, and sending the second e-mail to a recipient corresponding to the recipient information included in the mailing information; wherein
   the operation unit comprises a display device for displaying the one-touch keys.

2. An image forming apparatus according to claim 1, wherein where additional information to be used when original document reading is executed by the image reader is included in the first e-mail received by the receiving unit, the controller loads the additional information when the created one-touch key corresponding to the mailing information for the first e-mail that includes the additional information is selected.

3. An image forming apparatus according to claim 2, wherein the additional information comprises information indicating parameters pertaining to original document reading carried out by the image reader.

4. An image forming apparatus according to claim 2, wherein the additional information comprises a program file to be executed in order to provide help information to the user when original document reading is carried out by the image reader.

5. An image forming apparatus according to claim 2, wherein the additional information comprises a program file executed in order to provide audio guidance to the user when original document reading is carried out by the image reader.

6. An information processing method executed by an apparatus having a function to send and receive e-mails to and from one or more prescribed information processing terminals, as well as to create an image file by reading an original document, the information processing method comprising the steps of:
   receiving a first e-mail;
   determining whether or not the received first e-mail is an e-mail instructing registration of a one-touch key that is provided on an operation unit of the apparatus which comprises a display device for displaying one-touch keys and receives selection operations carried out by a user;
   obtaining from the received first e-mail mailing information including at least recipient information and one or more files attached to the first e-mail where it is determined that the first e-mail is an e-mail instructing one-touch key registration;
   storing the obtained mailing information and one or more files in a prescribed storage unit;
   creating a new one-touch key on the display device when it is determined at the determining step that the received first e-mail is an e-mail instructing one-touch key registration;
   associating the mailing information and attached file information with the created one-touch key, wherein the attached file information comprises information pertaining to the one or more attached files; and
   where reading of an original document is specified by a selection operation carried out using the created one-touch key, reading the mailing information and the attached file information associated with the created one-touch key, creating a second e-mail to which are attached the one or more files corresponding to the attached file information and the image file created during original document reading, and sending the second e-mail to a recipient corresponding to the recipient information included in the mailing information.

7. An information processing method according to claim 6, further comprising a step of, where additional information to be used when original document reading is executed is included in the received first e-mail, loading the additional information when the created one-touch key corresponding to the mailing information for the first e-mail that includes the additional information is selected.

8. An information processing method according to claim 7, wherein the additional information comprises information indicating parameters pertaining to original document reading.

9. An information processing method according to claim 7, wherein the additional information comprises a program file to be executed in order to provide help information to the user when original document reading is carried out.

10. An information processing method according to claim 7, wherein the additional information comprises a program file executed in order to provide audio guidance to the user when original document reading is carried out.

11. A non-transitory computer program product for causing an apparatus, that has a function to send and receive e-mails to and from one or more prescribed information processing terminals, as well as to create an image file by reading an original document, execute processing comprising the steps of:

receiving first e-mail;

determining whether or not the received first e-mail is an e-mail instructing registration of a one-touch key that is provided on an operation unit of the apparatus which comprises a display device for displaying one-touch keys and receives selection operations carried out by a user;

obtaining from the received first e-mail mailing information including at least recipient information and one or more files attached to the first e-mail where it is determined that the first e-mail is an e-mail instructing one-touch key registration;

storing the obtained mailing information and one or more files in a prescribed storage unit;

creating a new one-touch key on the display device when it is determined at the determining step that the received first e-mail is an e-mail instructing one-touch key registration;

associating the mailing information and attached file information with the created one-touch key, wherein the attached file information comprises information pertaining to the one or more attached files; and where reading of an original document is specified by a selection operation carried out using the created one-touch key, reading the mailing information and the attached file information associated with the created one-touch key, creating a second e-mail to which are attached the one or more files corresponding to the attached file information and the image file created during original document reading, and sending the second e-mail to a recipient corresponding to the recipient information included in the mailing information.

12. An image forming apparatus comprising:

an image reader for creating an image file by reading an original document;

an operation unit that includes one-touch keys that receive selection operations carried out by a user;

a receiving unit for receiving first e-mail;

a determination unit for determining whether or not the first e-mail received by the receiving unit is an e-mail instructing one-touch key registration;

an obtaining unit for, where it is determined by the determination unit that the received first e-mail is an e-mail instructing one-touch key registration, obtaining from the first e-mail mailing information including at least recipient information;

a storage unit for storing the mailing information obtained by the obtaining unit;

an association unit for creating a new one-touch key on the display device and associating the mailing information with the new one-touch key when it is determined by the determination unit that the received first e-mail is an e-mail instructing one-touch key registration; and a controller for, where reading of an original document by the image reader is specified by a selection operation carried out using the created one-touch key, reading the mailing information associated with the created one-touch key, creating a second e-mail to which is attached the image file created during original document reading, and sending the second e-mail to a recipient corresponding to the recipient information included in the mailing information; wherein the operation unit comprises a display device for displaying the one-touch keys.

13. An information processing method executed by an apparatus having a function to send and receive e-mails to and from one or more prescribed information processing terminals, as well as to create an image file by reading an original document, the information processing method comprising the steps of:

receiving a first e-mail;

determining whether or not the received first e-mail is an e-mail instructing registration of a one-touch key that is provided on an operation unit of the apparatus which comprises a display device for displaying one-touch keys and receives selection operations carried out by a user;

obtaining from the received first e-mail mailing information including at least recipient information where it is determined that the first e-mail is an e-mail instructing one-touch key registration;

storing the obtained mailing information in a prescribed storage unit;

creating a new one-touch key on the display device when it is determined at the determining step that the received first e-mail is an e-mail instructing one-touch key registration;

associating the mailing information with the created one-touch key; and where reading of an original document is specified by a selection operation carried out using the created one-touch key, reading the mailing information associated with the created one-touch key, creating a second e-mail to which is attached the image file created during original document reading, and sending the second e-mail to a recipient corresponding to the recipient information included in the mailing information.

14. A non-transitory computer program product for causing an apparatus, that has a function to send and receive e-mails to and from one or more prescribed information processing terminals, as well as to create an image file by reading an original document, execute processing comprising the steps of:

receiving a first e-mail;

determining whether or not the received first e-mail is an e-mail instructing registration of a one-touch key that is provided on an operation unit of the apparatus which comprises a display device for displaying one-touch keys and receives selection operations carried out by a user;

obtaining from the received first e-mail mailing information including at least recipient information where it is determined that the first e-mail is an e-mail instructing one-touch key registration;

storing the obtained mailing information in a prescribed storage unit;

creating a new one-touch key on the display device when it is determined at the determining step that the received first e-mail is an e-mail instructing one-touch key registration;

associating the mailing information with the created one-touch key; and where reading of an original document is specified by a selection operation carried out using the created one-touch key, reading the mailing information associated with the created one-touch key, creating a second e-mail to which is attached the image file created during original document reading, and sending the second e-mail to a recipient corresponding to the recipient information included in the mailing information.

* * * * *